(12) United States Patent
Lee

(10) Patent No.: US 10,941,984 B2
(45) Date of Patent: Mar. 9, 2021

(54) SYSTEM AND METHOD FOR DRYING LIGNITE

(71) Applicant: Joo Sun Lee, Seongnam-si (KR)

(72) Inventor: Joo Sun Lee, Seongnam-si (KR)

(*) Notice: Subject to any disclaimer, the term of this patent is extended or adjusted under 35 U.S.C. 154(b) by 445 days.

(21) Appl. No.: 15/805,163

(22) Filed: Nov. 7, 2017

(65) Prior Publication Data

US 2018/0209738 A1    Jul. 26, 2018

(30) Foreign Application Priority Data

Jan. 24, 2017    (KR) .......................... 10-2017-0011007

(51) Int. Cl.
*F26B 23/00* (2006.01)
*F26B 1/00* (2006.01)
*F26B 3/20* (2006.01)
*F26B 17/20* (2006.01)
*C10L 5/04* (2006.01)
(Continued)

(52) U.S. Cl.
CPC .......... *F26B 23/004* (2013.01); *B01D 1/2856* (2013.01); *B01D 5/0003* (2013.01);
(Continued)

(58) Field of Classification Search
CPC ...... B01F 15/065; B01F 15/063; B01F 15/06; B02C 17/1815; B02C 19/186; B02C 23/24; B02C 23/34; B02C 23/00; B02C 23/10; F26B 23/004; B01D 5/0003; B01D 5/0009; B01D 5/006; B01D 5/0075; B01D 5/009; B01D 1/2856; C10L 2290/08; C10L 2290/2804
(Continued)

(56) References Cited

U.S. PATENT DOCUMENTS 3,985,516 A    10/1976    Johnson et al.
4,498,633 A  *  2/1985    Williams ................ B02C 23/34
                                                       241/48
(Continued)

FOREIGN PATENT DOCUMENTS

CN    101581533 B    10/2010
CN    102965170 A    3/2013
(Continued)

*Primary Examiner* — Jason Skaarup
*Assistant Examiner* — Smith Oberto Bapthelus
(74) *Attorney, Agent, or Firm* — Berggren LLP

(57) ABSTRACT

The system for drying lignite according to the present disclosure includes a mill configured to crush the lignite; a dryer configured to receive crushed lignite from the mill, to dry the lignite by heat-exchange with steam and to discharge dried lignite; a condensing-precipitating evaporator in fluid communication with the dryer so as to receive vapor which is evaporated when the lignite is dried, and which is discharged from the dryer. The evaporator is configured to condense the vapor discharged from the dryer by heat-exchange with water. The coal dust contained in the vapor is precipitated into a condensed aqueous solution when the vapor is being condensed, and the condensed aqueous solution is discharged. The system includes a Mechanical Vapor Re-Compression (MVR) configured to receive steam generated from the condensing-precipitating evaporator, to compress the steam into superheated steam, and to supply the compressed superheated steam to the dryer.

9 Claims, 4 Drawing Sheets

(51) Int. Cl.
*F26B 25/00* (2006.01)
*F26B 3/04* (2006.01)
*F26B 11/16* (2006.01)
*B02C 19/18* (2006.01)
*B02C 23/24* (2006.01)
*B02C 23/34* (2006.01)
*B01D 1/28* (2006.01)
*B01D 5/00* (2006.01)
*B02C 23/00* (2006.01)
*B02C 23/10* (2006.01)

(52) U.S. Cl.
CPC ............ *B01D 5/006* (2013.01); *B01D 5/009* (2013.01); *B01D 5/0009* (2013.01); *B01D 5/0075* (2013.01); *B02C 19/186* (2013.01); *B02C 23/00* (2013.01); *B02C 23/24* (2013.01); *B02C 23/34* (2013.01); *C10L 5/04* (2013.01); *F26B 1/005* (2013.01); *F26B 3/04* (2013.01); *F26B 3/20* (2013.01); *F26B 11/16* (2013.01); *F26B 17/20* (2013.01); *F26B 25/007* (2013.01); *B02C 23/10* (2013.01); *C10L 2290/08* (2013.01); *C10L 2290/28* (2013.01)

(58) Field of Classification Search
USPC ................................. 241/65, 66, 23
See application file for complete search history.

(56) References Cited

U.S. PATENT DOCUMENTS

| | | | | |
|---|---|---|---|---|
| 4,514,912 | A * | 5/1985 | Janusch | F26B 7/00 34/393 |
| 4,541,572 | A * | 9/1985 | Tamura | C21B 5/003 241/31 |
| 4,601,115 | A * | 7/1986 | Draper | C10F 5/00 34/131 |
| 4,602,438 | A | 7/1986 | Draper et al. | |
| 5,361,513 | A * | 11/1994 | Woessner | C10L 5/02 34/363 |
| 8,714,467 | B2 * | 5/2014 | Lucas | B02C 13/00 241/188.1 |
| 8,997,376 | B2 * | 4/2015 | Carnegie | F26B 17/14 201/29 |
| 2010/0313442 | A1 * | 12/2010 | Russell | F23K 1/04 34/468 |
| 2011/0041393 | A1 | 2/2011 | Sugita et al. | |
| 2011/0173836 | A1 * | 7/2011 | Orr | F26B 3/084 34/417 |
| 2011/0265342 | A1 | 11/2011 | Shi et al. | |
| 2012/0055158 | A1 * | 3/2012 | Berger | B01D 53/1475 60/645 |
| 2015/0056125 | A1 * | 2/2015 | Rossi | B01J 6/001 423/438 |
| 2016/0348023 | A1 * | 12/2016 | Edel | F26B 3/20 |

FOREIGN PATENT DOCUMENTS

| | | | |
|---|---|---|---|
| CN | 103602360 B | 1/2016 | |
| CN | 104197684 B | 2/2016 | |
| CN | 105523702 | * 2/2016 | ............ C02F 11/12 |
| CN | 105523702 A | 4/2016 | |
| JP | S61255989 A | 11/1983 | |
| KR | 10-1216769 | 12/2012 | |
| KR | 10-1216827 | 12/2012 | |
| KR | 10-1408148 | 6/2014 | |

\* cited by examiner

SYSTEM AND METHOD FOR DRYING LIGNITE

PRIORITY

This application claims priority of Korean national application KR10-2017-0011007 filed on Jan. 24, 20017, the contents of which are incorporated herein by reference.

BACKGROUND

Field

The present disclosure relates to a system and method for drying a low grade coal, i.e., a lignite containing high moisture, and more particularly, to a system and method with increased thermal efficiency, by utilizing the vapor generated when the low grade coal is dried, and capable of supplying steam generated by heat-exchange with the vapor generated from the low grade coal, to a Mechanical Vapor Re-Compression (MVR) and a dryer.

Description of Related Art

Recently, there is a tendency to refrain from using nuclear power plants due to safety problems associated with disasters, and a growing interest in conventional power generation facilities such as thermal power plants.

Thermal power plants generally use enormous amount of coal buried on earth, as fuel. Coal, which is used as the main fuel for steam power plants, requires low moisture content. Coal with high moisture content has low calorific value, and therefore leads to problems where the quantity of heat consumed for the evaporation during combustion lowers the combustion efficiency and increases the cost for transporting coal.

Lignite, which is classified as a low-grade coal, has high moisture content and low calorific value, and therefore, when lignite is used in thermal power plants, its low thermal efficiency and high emissions of $CO_2$ and $SO_2$ lead to problems of low economic feasibility and environment pollution.

Thermal power plants are designed on the basis of using coal having low moisture content, and thus, in order to use a low-grade coal such as lignite, a dehydrating process must be performed. Accordingly, there are technologies known for drying low grade coal having high moisture content such as lignite to reduce the moisture content.

One example is a technology of supplying hot heated air inside a transfer tube while transferring lignite through the outside transfer tube so as to dry the lignite. This technology creates safety accident problems since the contact of pulverized coal with air causes ignition.

Another well-known example is a technology of supplying superheated vapor to lignite so as to remove moisture from the surface of the lignite. Here, the superheated vapor directly contacts the lignite to remove moisture, and therefore, there is a problem of low efficiency in removing moisture, and low effectiveness considering the cost for operating an additional device needed to continuously supply the superheated vapor.

Further, another technology has been developed where fluidized bed dryers use latent heat of discharging vapor of low pressure turbines and exhaust gas of boilers, but the latent heat is either insufficient or the temperature is too low, causing limitations in the evaporation and the reduction of water.

Not only that, drying lignite generates harmful substances, and thus there is also a problem of disposing the harmful substances properly.

SUMMARY

Therefore, a purpose of the present disclosure is to solve the aforementioned problems of prior art, that is to dry lignite with high efficiency by recycling the vapor generated when the lignite is dried.

Especially, the purpose of the present disclosure is to utilize the vapor generated from lignite, as a heat source for generating steam to be supplied to a dryer, as a heat source for preheating the lignite supplied to the dryer, and further, as a vapor sweeper for facilitating the evacuation of saturated vapor from the dryer.

Further, another purpose of the present disclosure is to efficiently dispose coal-dust and harmful substances cogenerated when the lignite is dried.

Further, another purpose of the present disclosure is to generate and circulate the steam to be used in the dryer, inside the system.

The aforementioned purposes of the present disclosure may be achieved by a system for drying lignite, the system comprising: a mill configured to crush the lignite to the required size; a dryer configured to receive crushed lignite from the mill, to dry the lignite by heat-exchange with steam and to discharge dried lignite; a condensing-precipitating evaporator in fluid communication with the dryer so as to receive vapor which is evaporated when the lignite is dried and which is discharged from the dryer, wherein the evaporator is configured to condense the vapor discharged from the dryer by heat-exchange with water, wherein coal dust contained in the vapor is precipitated into a condensed aqueous solution when the vapor is being condensed, and wherein the condensed aqueous solution is discharged; and a Mechanical Vapor Re-Compression (MVR) configured to receive steam generated from the condensing-precipitating evaporator, to compress the steam into superheated steam, and to supply the compressed overheated steam to the dryer.

Some of the steam discharged from the dryer may be supplied to the dryer to serve as a vapor sweeper.

The system according to the present disclosure may further include a centrifugal separator configured to receive the condensed aqueous solution from the condensing-precipitating evaporator and to separate the aqueous solution from the coal dust.

The system according to the present disclosure may further include a pre-heater configured to receive separated aqueous solution from the centrifugal separator and to pre-heat the lignite discharged from the mill by heat-exchange with the separated aqueous solution.

The system according to the present disclosure may further include a centrifugal blower configured to pressurize the vapor which is supplied to the condensing-precipitating evaporator and to the dryer as superheated sweep steam.

The system according to the present disclosure may further include a heat-exchanger configured to receive some of the superheated steam compressed in the Mechanical Vapor Re-Compression (MVR) and to convert the vapor discharged from the dryer into superheated vapor by heat-exchange with the supplied superheated steam.

The steam supplied to the dryer may be discharged as hot water condensate, and the system according to the present disclosure may further include a flash evaporator configured to receive the hot water condensate discharged from the dryer, to evaporate the hot water into steam and to supply the steam to the Mechanical Vapor Re-Compression (MVR).

The dryer may comprise an inlet into which the lignite is introduced, an outlet which discharges the dried lignite, a vapor outlet which discharges the vapor generated when the lignite is dried, an superheated vapor inlet into which a vapor sweeper is introduced, a plurality of hollow shafts through which the steam passes and which are arranged in parallel inside the dryer, and a plurality of disks attached to the hollow shafts and configured to rotate to transfer the supplied lignite towards the outlet when the supplied lignite is stirred, the plurality of disks having paddies, and wherein the plurality of disks may be arranged at predetermined intervals such that each disk of one shaft are arranged between the disks of the other shaft.

The condensing-precipitating evaporator may include one or more vapor conduits through which the vapor discharged from the dryer passes and a shell which surrounds the vapor conduit, and which is configured to receive water for the heat-exchange so as to condense the vapor of the vapor conduit and to discharge the steam generated by evaporation of the water.

Further, the aforementioned purposes of the present disclosure may be achieved by a method for drying lignite, the method including pulverizing the lignite and supplying pulverized lignite to a dryer; drying the lignite supplied to the dryer by heat-exchange with steam; supplying vapor generated when the lignite is dried to a condensing-precipitating evaporator, condensing the supplied vapor by heat-exchange with water, and then precipitating coal dust incorporated when condensing the vapor; and compressing steam evaporated from the water by heat-exchange, by means of a Mechanical Vapor Re-Compression (MVR) such that the steam is compressed into superheated steam, and then supplying the superheated steam to the dryer.

The method according to the present disclosure may further include converting the vapor generated when the lignite is dried into superheated vapor, pressure-blowing the overheated vapor, and then supplying the superheated vapor to the dryer as a vapor sweeper.

The method according to the present disclosure may further include separating an aqueous solution which is condensed, and which is discharged from the condensing-precipitating evaporator into an aqueous solution and a slurry by means of a centrifugal separator, supplying the separated aqueous solution to a pre-heater to pre-heat the pulverized lignite, and supplying the separated slurry back to the dryer.

The method according to the present disclosure may further include converting the vapor discharged from the dryer into superheated vapor by heat-exchange with some of the superheated steam compressed in the Mechanical Vapor Re-Compression (MVR).

The method according to the present disclosure may further include evaporating hot water condensate discharged from the dryer by means of a flash evaporator and supplying the evaporated steam to the Mechanical Vapor Re-Compression (MVR).

According to the system for drying lignite of the present disclosure, the vapor generated when the lignite is dried may be used as a heat source for the steam to be supplied to the dryer.

Further, the vapor generated when the lignite is dried may be used to preheat the lignite.

Further, the vapor generated when the lignite is dried may be used as a vapor sweeper of the dryer.

Further, the coal-dust and harmful substances generated when the lignite is dried may be separated and processed to reduce environment pollution.

Further, the steam to be used in the dryer may be generated by the system itself and circulated, without being supplied from outside, except during an initial startup stage of operation.

Due to the aforementioned characteristics, the present disclosure is capable of operating a system for drying lignite with very high energy efficiency and effective pollution removal.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present between two elements. Like reference numerals refer to like elements throughout.

DETAILED DESCRIPTION

Hereinbelow, a system for drying lignite according to an embodiment of the present disclosure will be described in detail with reference to the drawings attached.

Figure 1:
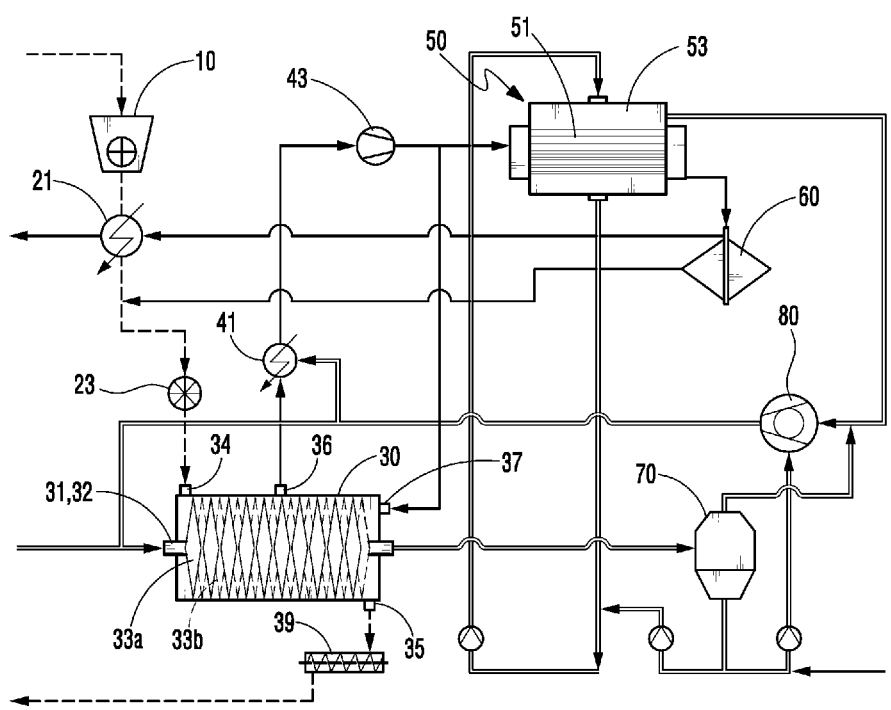
FIG. 1 is a view schematically illustrating a system for drying lignite according to an embodiment of the present disclosure.

FIG. 1 is a view schematically illustrating the overall configuration of a system for drying lignite.

For reference, a process for conveying lignite is indicated in dotted lines, a process where vapor generated when the lignite is dried flows is indicated in solid lines, and a flow of steam being supplied to a dryer is indicated in double solid lines.

A low-grade coal with high moisture content such as lignite is put into a mill 10 and then the coal is crushed. For convenience of explanation, the present specification is described based on an assumption that lignite is selected as the low grade coal, and it should be noted that in the present disclosure, the coal which is dried is not limited to a lignite only, but may include any kind of a low grade coal.

Lignite usually contains 40 to 65 wt-% of moisture, and the particle size of the lignite is 0 to 100 mm. Such lignite is put into the mill 10 and then crushed until its particle size is reduced to about 0 to 2 mm.

The pulverized lignite is introduced into the dryer 30, and after moisture is removed from the lignite, the lignite is discharged.

Preferably, the lignite that passed through the mill is introduced into the dryer 30 and may pass through a pre-heater 21 and a rotary feeder 23 before it is put into the dryer.

By the pre-heater 21, the milled lignite may be pre-heated to about 80 degrees Celsius. Preferably, the heat source needed for the pre-heater is condensed aqueous solution which is discharged from a condensing-precipitating evaporator 50 that will be explained hereinafter. Specifically, the condensed aqueous solution used in the pre-heater is supplied from a centrifugal separator 60 that will be explained hereinafter, and has a temperature of about 100 degrees Celsius. The lignite may be pre-heated by performing an indirect heat-exchange with the condensed aqueous solution.

Meanwhile, the lignite is supplied to the dryer 30 via the rotary feeder 23. In this case, the rotary feeder 23 prevents the vapor evaporated in the dryer from counter-flowing towards a pipe line which supplies the lignite. The rotary feeder 23 is a generally known device, and thus detailed explanation thereof will be omitted.

Figure 4:
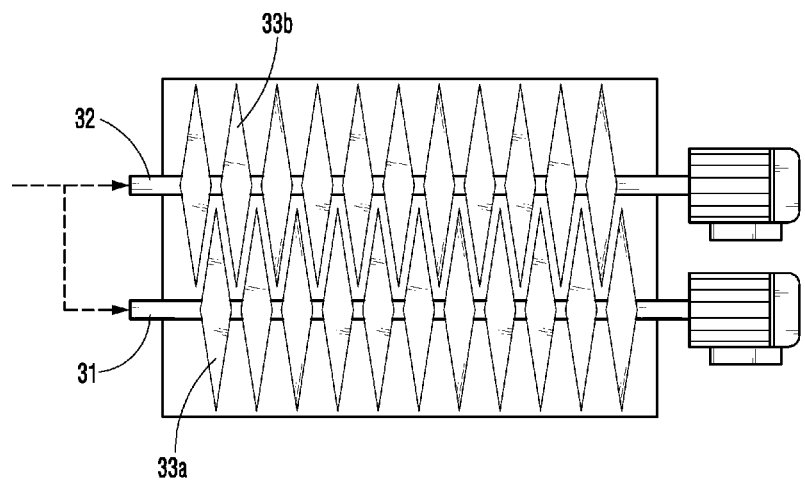
FIG. 4 is a cross-section view of a dryer according to an embodiment of the present disclosure.

The dryer 30 is a device configured to remove moisture from lignite. As illustrated in FIGS. 1 and 4, the dryer 30 has an inlet 34 into which the lignite may be introduced, and which is formed on a top end at one side of the dryer 30, and an outlet 35 which discharges the dried lignite and which is formed on a bottom end at the other side of the dryer 30. Further, the dryer 30 includes a plurality of rotating hollow shafts 31, 32 installed inside a housing. The hollow shafts 31, 32 are provided with a plurality of disks 33 which rotate by the hollow shaft of the dryer.

The plurality of hollow shafts 31, 32 are arranged side by side in parallel, and the disks 33*a*, 33*b* are respectively arranged at certain intervals such that each disk 33*b* of the shaft 32 is arranged between the disks 33*a* of the shaft 31. The pulverized coal (pulverized lignite) introduced into the dryer accumulates between the disks 33*a*, 33*b*, and the two hollow shafts 31, 32 and the disks 33*a*, 33*b* counter-rotate at different speeds, and thus as the pulverized coal is transferred along an axial direction (from the left to the right side in the drawing) by the paddles attached to the disks of the shafts at appropriate angles, the pulverized coal is mixed, and the dried pulverized coal is finally discharged through the outlet 35.

The inside of the hollow shafts 31, 32 are designed such that steam may pass through the inside. The superheated steam is supplied to the inside of the hollow shafts with a pressure of about 4 to 6 barA. Heat is transferred to the hollow shafts and the disk surface by the steam, and the milled coal which contacts the hollow shafts and disks is dried by the latent heat being conducted from the steam. Heat-exchange between the lignite and the steam is performed by the indirect contact of the lignite with the hollow shaft through which the steam passes and the disk, not by the direct contact of the lignite with the steam.

Further, the milled coal is transferred while being intensely mixed between the disks 33*a*, 33*b* which counter-rotate with respect to each other, and during this process the pulverized coal receives heat by contacting the surfaces of the disks, and therefore, the moisture contained in the milled coal is evaporated and separated as vapor. As the present disclosure uses the plurality of disks that are arranged in parallel, the heat transfer area is increased and mixing the milled coal is facilitated, thereby significantly improving the drying efficiency of the milled coal.

The number of revolutions of each of the two hollow shafts and the disks are controlled by respective frequency control motors, and thus it is possible to achieve a targeted moisture removal rate by appropriately adjusting the time duration for drying the milled coal.

Further, it is preferable to adjust the evaporating pressure inside the dryer 30 such that it exceeds atmospheric pressure. If the pressure inside the dryer 30 is identical to or lower than atmospheric pressure, the vacuum condition causes air to be introduced from outside, thus leading to a possibility that a safety accident of ignition of the milled coal could take place. Therefore, in order to prevent such a safety accident, it is preferable to control the pressure inside the dryer 30 to be maintained higher than the atmospheric pressure.

Meanwhile, in order to promptly discharge from the dryer the vapor which is evaporated from the milled coal, inert gas such as nitrogen or superheated steam may be introduced into the dryer as a vapor sweeper. The dryer 30 may be provided with a superheated steam inlet 37 to supply the superheated steam into the dryer. Using the superheated steam as the vapor sweeper gas ensures stability, and not only that, recycling the evaporated vapor discharged from the dryer, as will be explained hereinafter, may increase the efficiency of the system.

The milled coal dried in the dryer may be discharged outside through the outlet 35, and the discharged milled coal may be transferred to a storage facility through a conveyor 39.

Figure 2:
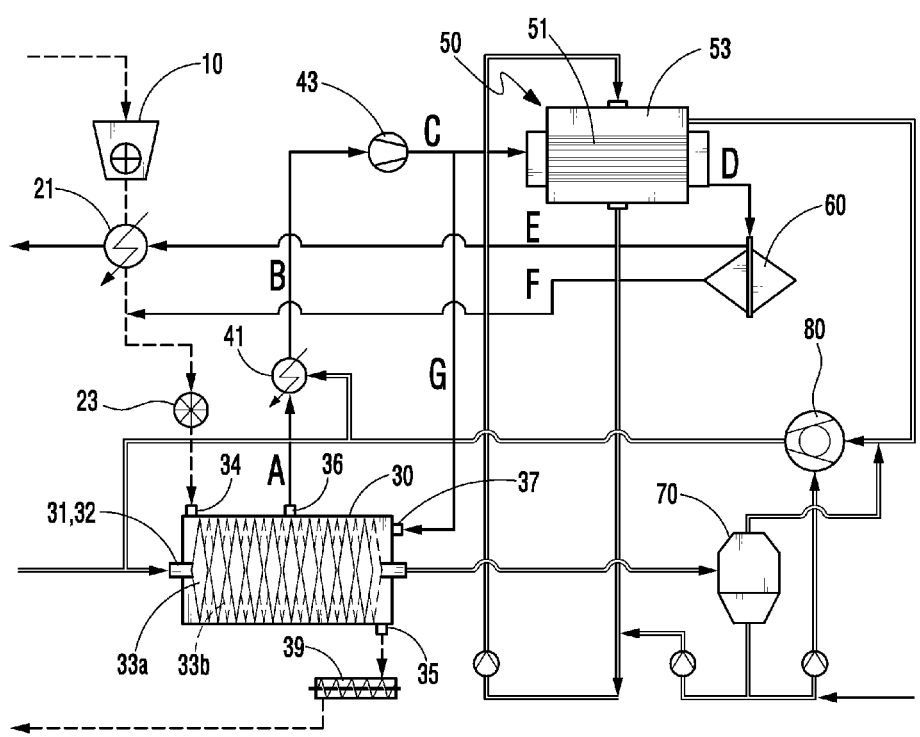
FIG. 2 is a view illustrating a flow of vapor discharged from a dryer of FIG. 1.

As can be seen from FIGS. 1 and 2, the moisture evaporated from the milled coal is discharged through a vapor outlet 36, in the form of saturated vapor. The discharged saturated vapor is heated until it becomes superheated vapor, and then is transferred to the condensing-precipitating evaporator 50. Further, some of this superheated vapor may diverge before it is supplied to the condensing-precipitating evaporator 50, and the diverged vapor is supplied to the dryer 30 such that it is used as the vapor sweeper.

Preferably, the saturated vapor which is discharged from the dryer passes through a heat-exchanger 41 before it is introduced into the condensing-precipitating evaporator 50. By the heat-exchanger 41, the saturated vapor is heated to superheated vapor. Superheated steam compressed in a Mechanical Vapor Re-Compression (MVR) 80 that will be explained hereinafter may be used as a heat source for the heat-exchanger 41. In this regard, between the saturated vapor and the superheated steam, indirect heat-exchange may be performed.

When the saturated vapor is turned into superheated vapor by the heat-exchanger 41, this superheated vapor may be supplied to the condensing-precipitating evaporator 50 without being condensed during the transfer. Further, when necessary, the superheated vapor may be supplied to the dryer 30 to be used as the vapor sweeper.

Further, preferably, the superheated vapor is pressurized by a centrifugal blower 43 before it is supplied to the condensing-precipitating evaporator 50. The centrifugal blower 43 appropriately pressurizes the superheated vapor so that the superheated vapor has the pressure necessary for vapor sweeper and for being condensed in the condensing-precipitating evaporator 50.

The condensing-precipitating evaporator 50 is a device configured to acquire the condensing latent heat from the superheated vapor and to discharge the condensed aqueous solution.

Figure 5:
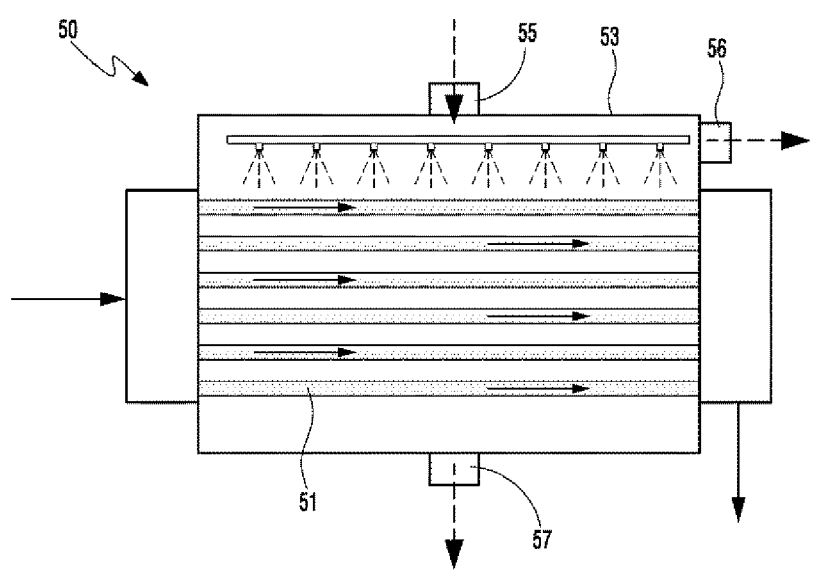
FIG. 5 is a longitudinal-section view of the condensing-precipitating evaporator according to an embodiment of the present disclosure.

As can be seen from FIG. 5, the condensing-precipitating evaporator 50 includes a shell 53 which defines a housing, and a vapor conduit 51 arranged inside the shell 53. The vapor conduit 51 is a tube through which the superheated vapor passes and the vapor conduit 51 is preferably formed by a plurality of tubes. The overheated vapor is condensed as it passes through the vapor conduit 51 and then is discharged in the form of condensed aqueous solution.

Water is supplied to the shell 53 through a water inlet 55 and some of this water is discharged through a low-pressure steam outlet 56 after it is evaporated by heat-exchange with the vapor conduit 51 and the remaining water which is not evaporated is discharged through a water outlet 57.

That is, the water supplied to the inside of the shell 53 contacts the external surface of the vapor conduit 51 through which the superheated vapor passes through. Here, the superheated vapor is condensed as it transfers heat to the water while the water contacting the vapor conduit 51 is turned into low pressure steam by the condensing latent heat generated during the condensation of the overheated vapor, and then the low-pressure steam is supplied to the Mechanical Vapor Re-Compression (MVR) 80 that will be explained hereinafter. The superheated vapor passing through the vapor conduit performs heat-exchange not by directly contacting the water supplied to the shell but by indirect heat-exchange based on the contact being made between the vapor conduit 51 and the water.

Further, when the superheated vapor is being condensed into condensed aqueous solution, a small amount of solvent and coal dust contained in the overheated vapor are incorporated together into the condensed aqueous solution, thereby the solvent being condensed and the coal dust being precipitated.

Further, due to a pressure blowing of the centrifugal blower 43, the superheated vapor passes through the vapor conduit 51 at a high velocity of flow. By such a high velocity of flow of the superheated vapor, the condensed aqueous solution and the coal dust being precipitated in the condensed aqueous solution may be easily discharged.

Usually, an Electrostatic Precipitator (EST) is used as a precipitating device, and the efficiency of the Electrostatic Precipitator (EST) is determined by the electric resistance of polluted dust. However, since Electrostatic Precipitators (EST) cannot guarantee perfect efficiency, dust still remains in the vapor which is discharged through the Electrostatic Precipitator (EST), which may become a cause for system breakdown. Especially, if a vapor still containing dust is introduced into the Mechanical Vapor Re-Compression (MVR) 80, dust may become the main cause for interrupting normal operation or for breakdown of the Mechanical Vapor Re-Compression (MVR) 80.

Unlike the Electrostatic Precipitator (EST), the condensing-precipitating evaporator 50 of the present disclosure is a wet-type and achieves an excellent cleaning effect as it precipitates and condenses all the dust and solvent. Further, since the steam which is supplied to the Mechanical Vapor Re-Compression (MVR) 80 is a steam evaporated from pure water, the Mechanical Vapor Re-Compression (MVR) 80 may be prevented from breaking down due to pollutants.

In other words, the overheated vapor passing through the condensing-precipitating evaporator 50 of the present disclosure is not supplied to the Mechanical Vapor Re-Compression (MVR) 80, but is condensed into condensed aqueous solution, passes through the centrifugal separator that will be described hereinafter, and then is supplied to the pre-heater 21 or put into the dryer again together with lignite. The steam which is supplied from the condensing-precipitating evaporator 50 to the Mechanical Vapor Re-Compression (MVR) 80 is generated from the extra water used to condense the superheated vapor in the condensing-precipitating evaporator 50. Therefore, when the Electrostatic Precipitator (EST) is used, there occurs a problem where the steam containing dust is supplied to the Mechanical Vapor Re-Compression (MVR), but when the condensing-precipitating evaporator of the present disclosure is used, there is no risk that the steam containing dust is supplied to the Mechanical Vapor Re-Compression (MVR) 80.

The water discharged from the condensing-precipitating evaporator 50 through the water outlet 57 is introduced back into the condensing-precipitating evaporator 50 by means of a pump. That is, the water used in the condensing-precipitating evaporator 50 is circulated.

The condensed aqueous solution which is discharged from the condensing-precipitating evaporator 50 contains coal dust. This condensed aqueous solution is separated into coal dust and aqueous solution by the centrifugal separator 60. The separated aqueous solution may be supplied to the pre-heater 21 to pre-heat the milled lignite. Further, the separated coal dust may be conveyed in the form of slurry cake, and may be put into the dryer 30 or to the rotary feeder 23, together with the milled lignite which is supplied to the dryer 30.

The centrifugal separator 60 may consist of a first high speed separator and a second compression separator. The high-speed separator may separate the aqueous solution to supply the separated aqueous solution to the pre-heater, and the second compression separator may supply the dehydrated slurry cake to the rotary feeder 23. Configuration of a centrifugal separator is a generally well-known in the field of technology, and thus detailed explanation will be omitted.

Figure 3:
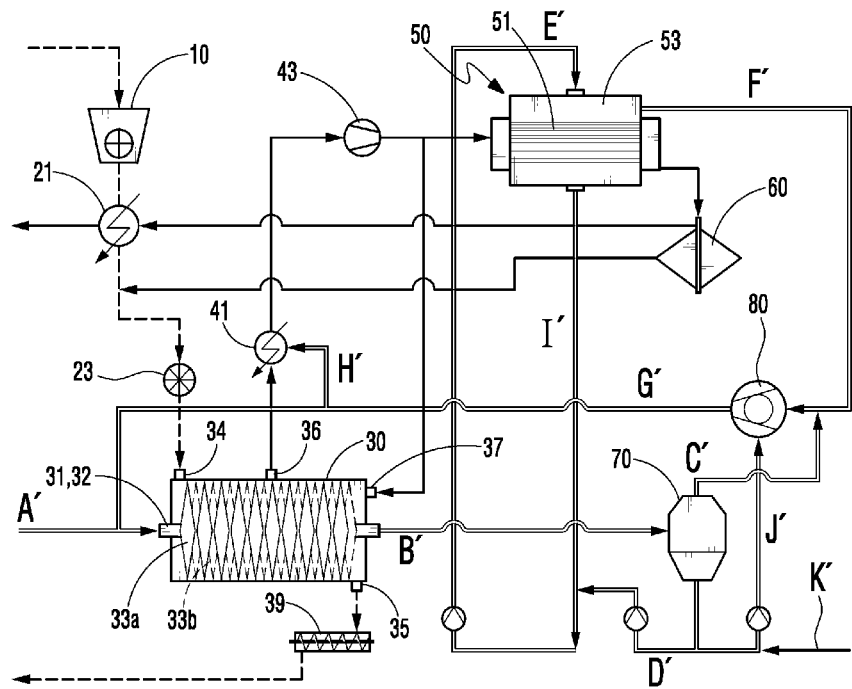
FIG. 3 is a view illustrating a flow of water entering and exiting a condensing-precipitating evaporator of FIG. 1 and a flow of steam discharged from the condensing-precipitating evaporator.

As can be seen from FIGS. 1 and 3, the low-pressure steam discharged from the condensing-precipitating evaporator 50 is introduced into the Mechanical Vapor Re-Compression (MVR) 80, is compressed and then is discharged as superheated steam just by the known principle of polytrophic efficiency.

Basically, the superheated steam which is discharged from the Mechanical Vapor Re-Compression (MVR) 80 is introduced into the dryer 30. Meanwhile, some of the superheated steam which is discharged from the Mechanical Vapor Re-Compression (MVR) 80 is diverged before it is introduced into the dryer 30, and then diverged superheated steam is provided to the heat-exchanger 41 arranged between the dryer 30 and the condensing-precipitating evaporator 50.

The heat-exchanger 41 enables heat-exchange between the saturated vapor which is discharged from the dryer 30 and the superheated steam which is discharged from the Mechanical Vapor Re-Compression (MVR) 80. Through the heat-exchanger 41, heat is transferred from the superheated steam discharged from the Mechanical Vapor Re-Compression (MVR) 80 to the saturated vapor discharged from the dryer 30, thereby turning the saturated vapor into superheated vapor.

As aforementioned, by using the superheated steam discharged from the Mechanical Vapor Re-Compression (MVR) instead of using an additional heat source for heating the saturated vapor, the apparatus may be simplified, thereby improving the efficiency and reducing the costs.

The steam condensed in the hollow shafts 31, 32 of the dryer 30 is discharged as hot condensate, and this hot condensate is introduced into a flash evaporator 70. The flash evaporator 70 evaporates the hot water, and then introduces evaporated steam into the Mechanical Vapor Re-Compression (MVR) 80. That is, not only the low-pressure steam discharged from the condensing-precipitating evaporator 50 as explained hereinabove, but also the steam discharged from the flash evaporator 70 is introduced into the Mechanical Vapor Re-Compression (MVR) 80.

The Mechanical Vapor Re-Compression (MVR) compresses the steam introduced up to the pressure required in the dryer, to convert the steam into superheated steam, and then supplies the superheated steam to the dryer 30. Therefore, at an initial startup stage of operation of the dryer 30, steam from outside is supplied to the dryer 30, but when predetermined conditions are satisfied after operating the Mechanical Vapor Re-Compression (MVR) 80, steam from outside is no longer used, but the steam discharged from the Mechanical Vapor Re-Compression (MVR) 80 is directly supplied to the dryer, thereby converting to a self-operation mode.

Meanwhile, in order to lower the superheated steam temperature that is generated when the steam is compressed, the Mechanical Vapor Re-Compression (MVR) 80 uses the hot water being discharged from the flash evaporator 70 as cooling water. As this cooling water evaporates, additional steam is generated. This additional steam may be used as a heat source for the dryer 30 or elsewhere.

The hot water that is not evaporated in the flash evaporator 70 joins the water discharged from the condensing-precipitating evaporator 50, and then is introduced into the condensing-precipitating evaporator 50, and also is introduced as the cooling water of the Mechanical Vapor Re-Compression (MVR) 80.

Hereinbelow, process by which the aforementioned system of the present disclosure operates will be explained. For better understanding, a process for drying lignite will be explained first, followed by an explanation on a flow of vapor that is generated when the lignite is dried, and followed by an explanation on a flow of steam which is supplied to the dryer.

With reference to FIG. 2, the process for drying the lignite and the flow of vapor that is generated when the lignite is dried will be explained. Especially, for better understanding, alphabets A to G will be used to explain the flow of the vapor.

A low grade lignite having high moisture content is put into the mill 10 and then is milled. It is preferable that the milled lignite is pre-heated in the pre-heater 21, and then is introduced into the dryer 30. By pre-heating the lignite before introducing it into the dryer 30, the efficiency of evaporating moisture from the lignite may be increased. Further, it is preferable that the milled lignite is put into the dryer 30 through the rotary feeder 23. By using the rotary feeder 23, it is possible to prevent a counter-flow of vapor which is generated from the dryer.

The milled lignite is put into the dryer 30, moisture is removed from the milled lignite, and then the milled lignite is discharged. The dried lignite is discharged through the outlet 35, and then is transferred to a lignite storage through the conveyor 39.

The moisture being generated from the lignite when the lignite is dried is discharged through the vapor outlet 36 in the form of saturated vapor (see A of FIG. 2).

It is preferable that the saturated vapor which is discharged through the vapor outlet 36 passes through the heat-exchanger 41 (see B of FIG. 2), and then is introduced into the condensing-precipitating evaporator 50 (see C of FIG. 2).

The saturated vapor receives heat from the heat-exchanger 41 and becomes superheated vapor, and the superheated vapor is introduced into the condensing-precipitating evaporator 50. As the saturated vapor becomes superheated vapor as aforementioned, the vapor is not condensed during transfer.

Further, some of the superheated vapor may be introduced into the dryer 30 (refer to G of FIG. 2). Some of the superheated vapor is introduced into the dryer 30 through the superheated vapor inlet 37 of the dryer 30 to serve as the vapor sweeper. Using the superheated vapor as the vapor sweeper may reduce the risk of explosion inside the dryer. Using air as the vapor sweeper may cause a problem of ignition of the lignite. And thus, using the superheated vapor instead of air prevents the problem of ignition.

Further, it is preferable that the superheated vapor is introduced into the condensing-precipitating evaporator 50 through the centrifugal blower 43. Pressurizing the superheated vapor with the centrifugal blower 43 increases a sectional flow velocity of the superheated vapor. The high pressure and flow velocity of the superheated vapor will ensure the easy cleaning effect of dust and solution from the condensing-precipitating evaporator 50 and the easy removal of the dust precipitated in the condensed solution from a surface of the vapor conduit, thereby facilitating the discharge of the condensed solution and the dust.

When the superheated vapor passes through the vapor conduit 51 of the condensing-precipitating evaporator 50, as the overheated vapor transfers heat to water contacting the exterior of the vapor conduit, the overheated vapor is condensed and becomes condensed aqueous solution. When the superheated vapor is being condensed, the dust and solvent contained in the superheated vapor are also incorporated into the condensed aqueous solution, and thus the dust and the solvent are discharged together with the condensed aqueous solution (see D of FIG. 2).

It is preferable that the condensed aqueous solution which is discharged from the condensing-precipitating evaporator 50 is used again instead of being thrown away. For this purpose, the condensed aqueous solution may be separated into water and coal dust by means of the centrifugal separator 60. The water from which coal dust is removed may be supplied to the pre-heater 21 as separated aqueous solution (see E of FIG. 2.) Further, the coal dust separated from the condensed aqueous solution may be put into the dryer 30 again together with lignite, in the form of slurry (see F of FIG. 2).

Referring to FIG. 3, the flow of steam which is supplied to the dryer will be explained in detail. Especially, for better understanding, alphabets A' to J' will be used to explain the flow of steam.

The steam to be supplied to the dryer 30 at the initial operation is supplied from outside source (see A' of FIG. 3.) This steam transfers heat to the disks 33a, 33b as it passes through the hollow shafts 31, 32 of the dryer 30, thereby drying the lignite that contacts the hollow shafts and the disks. The steam that is deprived of heat while passing through the hollow shafts and disc inside is discharged from the dryer 30 as hot water (see B' of FIG. 3).

The discharged hot water may be supplied to the condensing-precipitating evaporator 50 through a pump. Especially, it is preferable that the hot water which is discharged from the dryer passes through the flash evaporator 70, and then is introduced into the Mechanical Vapor Re-Compression (MVR) 80 (see C' of FIG. 3). The flash evaporator 70 evaporates the hot water to be introduced into the Mechanical Vapor Re-Compression (MVR) 80 and the hot water which is not evaporated is introduced into the condensing-precipitating evaporator 50 (see D' of FIG. 3) and Mechanical Vapor Re-Compression (MVR) 80 (see J' of FIG. 3).

Meanwhile, water is supplied to the condensing-precipitating evaporator 50. This water is supplied to the shell 53 of the condensing-precipitating evaporator 50, contacts the vapor conduit 51 arranged in the shell 53 and performs heat-exchange. The superheated vapor passing through the vapor conduit 51 is condensed by performing heat-exchange with the water. Here, the water absorbs condensation latent heat of the superheated vapor, so that some of the water is discharged as steam (see F' of FIG. 3), and the rest of the water is discharged as water (see I' of FIG. 3).

The water being discharged from the condensing-precipitating evaporator 50 is supplied back to the condensing-precipitating evaporator 50 (refer to E' of FIG. 3). Meanwhile, the water which is discharged from the condensing-precipitating evaporator 50 joins the hot water which is discharged from the flash evaporator 70, and the water discharged from the condensing-precipitating evaporator and the hot water discharged from the flash evaporator enter the condensing-precipitating evaporator 50 (see I', D' and E' of FIG. 3). That is, the water which is introduced into and discharged from the condensing-precipitating evaporator 50 circulate repeatedly. If the circulating water is insufficient, it is possible to supply extra water at a certain point of the pipe line where the water circulates (see K' of FIG. 3).

The low pressure steam which is discharged from the condensing-precipitating evaporator 50 is supplied to the Mechanical Vapor Re-Compression (MVR) 80 (refer to F' of FIG. 3).

The low-pressure steam leaving the condensing-precipitating evaporator 50 and the steam leaving the flash evaporator 70 are introduced into the Mechanical Vapor Re-Compression (MVR) 80. The Mechanical Vapor Re-Compression (MVR) 80 pressurizes the introduced steam and discharges the pressurized steam as superheated steam (see G' of FIG. 3). The superheated steam which is discharged from the Mechanical Vapor Re-Compression (MVR) 80 is introduced into the dryer 30 (see G' of FIG. 3). At the initial operation of the dryer 30, steam is supplied from outside source (see A' of FIG. 3), but when predetermined conditions are satisfied, for example, when superheated steam is generated by the Mechanical Vapor Re-Compression (MVR) 80, the dryer 30 may be operated by the superheated steam of the Mechanical Vapor Re-Compression (MVR) 80 alone without using any further steam from outside source.

Meanwhile, some of the superheated steam which is discharged from the Mechanical Vapor Re-Compression (MVR) 80 may be supplied to the heat-exchanger 41 (see H' of FIG. 3), and be used as a heat source of the heat-exchanger.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

REFERENCE NUMERALS

10: MILL
21: PRE-HEATER
23: ROTARY FEEDER
30: DRYER
41: HEAT-EXCHANGER
43: CENTRIFUGAL BLOWER
50: CONDENSING-PRECIPITATING EVAPORATOR
60: CENTRIFUGAL SEPARATOR
70: FLASH EVAPORATOR
80: MECHANICAL VAPOR RE-COMPRESSION (MVR)

What is claimed is:

1. A system for drying lignite, the system comprising:
   a mill configured to crush the lignite;
   a dryer configured to receive the crushed lignite from the mill, to dry the lignite by heat-exchange with steam and to discharge the dried lignite;
   a condensing-precipitating evaporator in fluid communication with the dryer so as to receive vapor which is evaporated when the lignite is dried and which is discharged from the dryer, wherein the evaporator is configured to condense the vapor discharged from the dryer by heat-exchange with water, wherein coal dust contained in the vapor is precipitated into a condensed aqueous solution when the vapor is being condensed, and wherein the condensed aqueous solution is discharged; and
   a mechanical vapor re-compression configured to receive steam generated from the condensing-precipitating evaporator, to compress the steam into superheated steam, and to supply the compressed superheated steam to the dryer,
   wherein the system further comprises a heat-exchanger arranged between the dryer and the condensing-precipitating evaporator, the heat-exchanger being configured to receive some of the superheated steam compressed by the mechanical vapor re-compression and configured to convert the vapor discharged from the dryer into superheated vapor by heat-exchange with the superheated steam, and a line branches off from the fluid communication between the dryer and the condensing-precipitating evaporator and is connected back to the dryer to supply some of the superheated vapor back to the dryer for making the superheated vapor act as a vapor sweeper which facilitates evacuation of the vapor evaporated from the lignite,
   wherein the condensing-precipitating evaporator comprises:
   one or more vapor conduits through which the vapor discharged from the dryer passes; and
   a shell which surrounds the one or more vapor conduits and which is configured to receive water for the heat-exchange so as to condense the vapor in the vapor conduit and to discharge the steam generated by evaporation of the water,
   wherein the dryer is configured to perform an indirect heat-exchange by indirect contact of the superheated steam with the lignite.

2. The system for drying lignite according to claim 1, further comprising a centrifugal separator configured to receive the condensed aqueous solution from the condensing-precipitating evaporator and to separate the aqueous solution from the coal dust.

3. The system for drying lignite according to claim 2, further comprising a pre-heater configured to receive the separated aqueous solution from the centrifugal separator and to pre-heat the lignite discharged from the mill by heat-exchange with the separated aqueous solution.

4. The system for drying lignite according to claim 1, further comprising a centrifugal blower configured to pressurize the vapor which is supplied to the condensing-precipitating evaporator.

5. The system for drying lignite according to claim 1, wherein the superheated steam supplied to the dryer is discharged from the dryer as hot water, and the system further comprises a flash evaporator configured to receive the hot water discharged from the dryer, to evaporate the hot water into secondary steam and to supply the secondary steam to the mechanical vapor re-compression.

6. The system for drying lignite according to claim 1, wherein the dryer comprises an inlet into which the lignite is introduced, an outlet which discharges the dried lignite, a vapor outlet which discharges the vapor generated when the lignite is dried, an superheated vapor inlet into which a sweep gas is introduced, a plurality of hollow shafts through which the steam passes and which are arranged in parallel inside the dryer, and a plurality of disks attached to the hollow shafts and configured to rotate to transfer the supplied lignite towards the outlet when the supplied lignite is stirred and dried, the plurality of disks having paddles, and wherein the plurality of disks are arranged at predetermined intervals such that each disk of one shaft are arranged between the disks of the other shaft.

7. A method for drying lignite using the system according to claim 1, the method comprising:
  miffing the lignite and supplying milled lignite to a dryer;
  drying the lignite supplied to the dryer by heat-exchange with steam;
  supplying vapor generated when the lignite is dried to a condensing-precipitating evaporator, condensing the supplied vapor by heat-exchange with water, and then precipitating coal dust incorporated when condensing the vapor; and
  compressing steam evaporated from the water by heat-exchange, by means of a mechanical vapor re-compression, such that the steam is converted into superheated steam, and then supplying the superheated steam to the dryer,
  wherein the vapor discharged from the dryer is converted into superheated vapor by means of a heat-exchanger arranged between the dryer and the condensing-precipitating evaporator and configured to perform heat-exchange of the vapor discharged from the dryer with some of the superheated steam compressed by the mechanical vapor re-compression and the superheated vapor is supplied back to the dryer by a line which branches off from a fluid communication between the dryer and the condensing-precipitating evaporator so as to act as a vapor sweeper which facilitates evacuation of the vapor evaporated from the lignite,
  wherein the superheated vapor supplied to the condensing-precipitating evaporator passes through a vapor conduit of the condensing-precipitating evaporator, and
  wherein the lignite is dried by an indirect heat-exchange which is carried out by indirect contact of the superheated steam with the lignite.

8. The method according to claim 7, further comprising separating a slurry from an aqueous solution which is condensed and which is discharged from the condensing-precipitating evaporator by means of a centrifugal separator, supplying the aqueous solution to a pre-heater to pre-heat the milled lignite, and supplying the slurry to the dryer.

9. The method according to claim 7, further comprising evaporating hot water condensate discharged from the dryer by means of a flash evaporator and supplying the evaporated steam to the mechanical vapor re-compression.

* * * * *